Aug. 6, 1929.  W. S. FARRAR  1,723,477
MAUL
Filed June 14, 1928
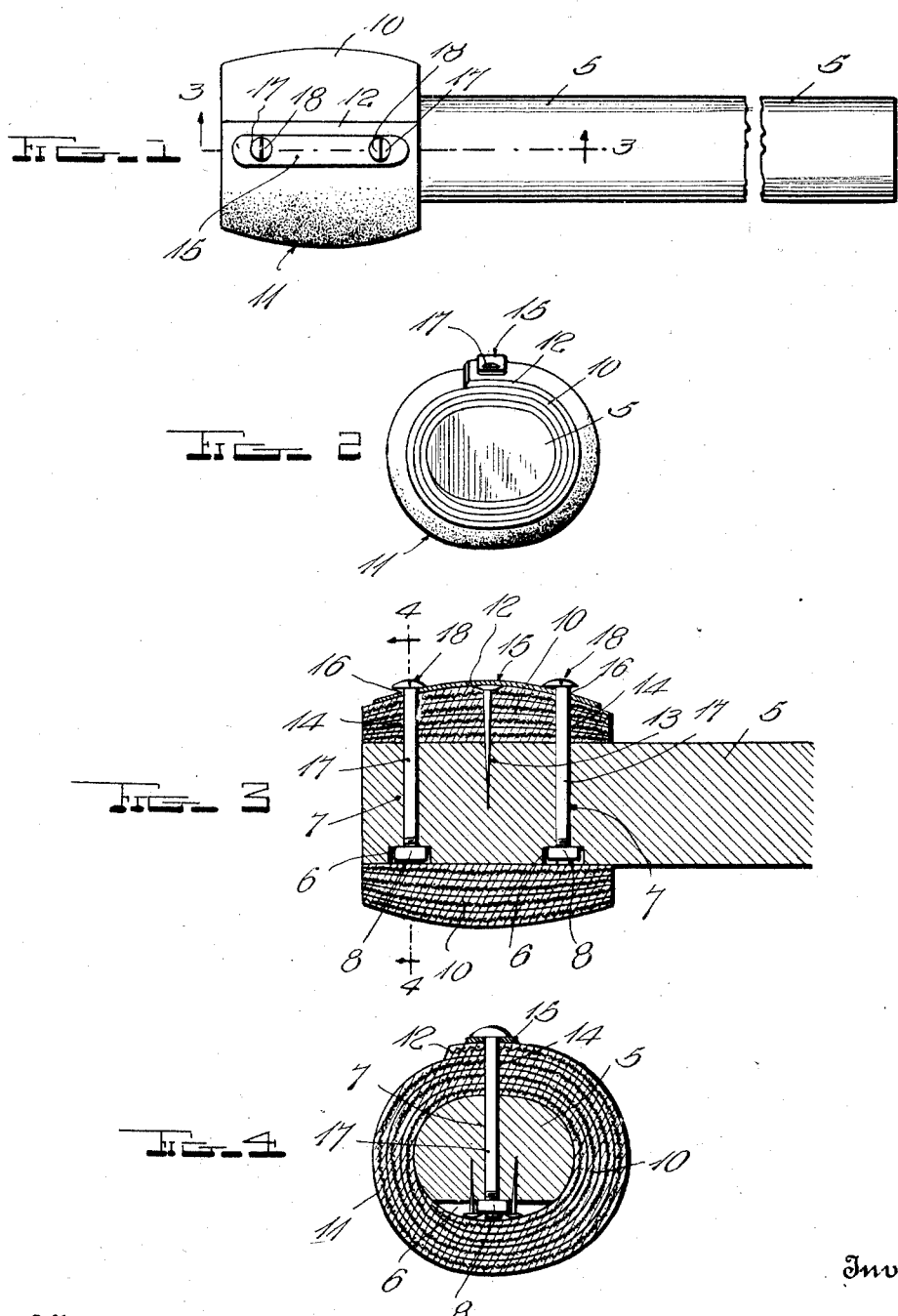
Inventor
W. S. Farrar,
By ... & Co.
Attorneys
Witness Patented Aug. 6, 1929.

1,723,477

UNITED STATES PATENT OFFICE.

WERTER S. FARRAR, OF OAKDALE, CALIFORNIA, ASSIGNOR OF ONE-HALF TO B. H. MATTESON, OF MODESTO, CALIFORNIA.

MAUL.

Application filed June 14, 1928. Serial No. 285,495.

The invention relates to a new and improved maul, designed primarily for dislodging nuts or fruit from trees, by striking the tree with the maul, thereby vibrating it and shaking the nuts or fruit loose.

In carrying out the above end, a further object is to provide a maul whose striking head is formed of alternate thicknesses of rubber and fabric, and it has been found that a head of this construction produces a recoil or rebound for obtaining a vibrating action upon the tree, not obtainable by other means or material.

At still further aim is to provide a new and improved construction in which the maul head may well be formed from a worn tire casing, providing a field of use for such casings which are ordinarily "junked."

Whether the maul head be formed of a flexible strip which previously formed part of a tire casing, or be formed of some other flexible material, it is another aim of the invention to provide effective means for tightly clamping the material to said handle, to form the maul head.

With the foregoing in view, the invention resides in the novel subject matter hereinafter described and claimed, description being accomplished by reference to the accompanying drawing.

Fig. 1 is a side elevation of a maul constructed in accordance with the invention.

Fig. 2 is an end elevation.

Fig. 3 is an enlarged longitudinal section on line 3—3 of Fig. 1.

Fig. 4 is an enlarged transverse section on line 4—4 of Fig. 3.

The drawing above briefly described illustrates the preferred form of construction, and while such construction will be herein specifically explained, it is to be understood that within the scope of the invention as claimed, variations may be made.

5 denotes an elongated handle of hickory or other desired material. Two parallel-sided grooves 6 are formed transversely in one side of the handle 5, diametrical openings 7 are formed through this handle in communication with said grooves 6, and nuts 8 are secured in said grooves in alinement with said openings 7, tacks being preferably driven into the handle with their heads in engagement with the nuts, to secure them against movement out of alinement with said openings.

A flexible strip 10 is wound a plurality of times around the front, grooved end of the handle 5 to provide a maul head 11 of desired size. The free end 12 of the strip is then temporarily secured by driving a nail 13 through the several convolutions of the head into the handle 5. This having been done, openings 14 are formed through said convolutions, in alinement with the openings 7. A longitudinally disposed rigid strip 15, preferably metal, is now placed upon the free end 12 of the strip 10, the ends of said strip being formed with openings 16. Bolts 17 are passed through the openings 16—14—7 and are threaded into the nuts 8, the heads of said bolts being provided with kerfs or the like 18 permitting rotation of them with a screw-driver or other appropriate tool. Tightening of these bolts effectively clamps the convolutions of the strip 10, between the rigid strip 15 and handle 5, and thus the maul head 11 is tightly secured in place, with its fastening means exposed at only one side of said head, so that there is no danger of injuring a tree with the maul when striking it with any portion of the head 11, except that at which the strip 15 is disposed.

I have found that the best vibratory action for dislodging nuts and fruit, is obtained when the head 11 is formed of alternate layers of rubber and fabric, vulcanized together. As an inexpensive way of providing such a construction, I prefer to form the strip 10 from tread and side wall portions of a used automobile tire, or in smaller constructions from a used bicycle tire. Then too, construction of the head from these portions of a tire imparts to said head a convex formation, due to the greater thickness at the tread than at the side walls of the tire.

When using the device to dislodge fruit from trees, a canvas sheet or an appropriate net is preferably used around the tree trunk to receive the falling fruit. This may also be done when using the maul to dislodge nuts from trees. Fruit and nut dislodging are the primary uses of the maul but it is to be understood that it may be employed wherever its use will be of advantage.

I claim:—

1. A maul comprising a handle, a flexible strip wound around the front end of said handle to provide a head, a rigid strip lying upon the outer end of said flexible strip, and fasteners passing through said rigid strip and securing it to said handle, the convolutions of said flexible strip being clamped between said rigid strip and said handle.

2. A maul comprising a handle having nut-receiving recesses in one side of its front end, and openings through said front end communicating with said recesses, nuts held in said recesses, a flexible head around said front end and extending over said recesses and nuts, a clamping strip lying against the exterior of said head, and bolts passing through the clamping strip and the head, said bolts extending through said openings and being threaded into said nuts.

3. A maul comprising a handle having nut receiving recesses in one side of its front end, and openings through said front end communicating with said recesses, nuts held in said recesses, a flexible strip wound around said front end and extending over said recesses and nuts to provide a maul head, a clamping strip lying against the free end of said flexible strip, and bolts passing through the clamping strip and the convolutions of the flexible strip, said bolts extending through said openings and being threaded into said nuts.

4. The method of constructing a maul, consisting in forming recesses in the front end portion of a handle at one side of the latter, forming openings through the handle in communication with the recesses, positioning nuts in said recesses in alinement with said openings, placing a flexible head around the recessed front end of the handle, applying a clamping strip to the exterior of said head, passing bolts through the ends of said clamping strip, the head and the aforesaid openings, and threading said bolts into said nuts.

5. The method of constructing a maul, consisting in forming recesses in the front end portion of a handle at one side of the latter, forming openings through the handle in communication with the recesses, positioning nuts in said recesses in alinement with said openings, wrapping a flexible strip around the recessed front end of the handle, applying a clamping strip to the free end of said flexible strip, passing bolts through the ends of said clamping strip, the convolutions of said flexible strip and the aforesaid openings, and threading said bolts into said nuts.

6. A fruit such as a nut loosening maul comprising a handle and alternate layers of live rubber and fabric secured around the front end of said handle and each extending about an axis disposed longitudinally of said handle, providing a head in which each layer of rubber will be momentarily compressed at each blow to obtain a recoil-producing blow rather than a driving blow.

7. A fruit such as a nut loosening maul comprising a handle, a strip wound around the front end of said handle on an axis extending longitudinally of the latter to provide a head, said strip being formed of live rubber and fabric thicknesses vulcanized together, whereby upon each blow the live rubber will be momentarily compressed, obtaining a recoil-producing blow rather than a driving blow.

In testimony whereof I have hereunto affixed my signature.

WERTER S. FARRAR.